United States Patent [19]

Foreman et al.

[11] Patent Number: 4,904,423

[45] Date of Patent: Feb. 27, 1990

[54] PRESSURE MOLDING PROCESS USING SALT CORES AND COMPOSITION FOR MAKING CORES

[75] Inventors: Robert W. Foreman, Bloomfield Hills; Michael T. Ives, Romulus, both of Mich.

[73] Assignee: Park Chemical Company, Detroit, Mich.

[21] Appl. No.: 666,493

[22] Filed: Oct. 30, 1984

Related U.S. Application Data

[63] Continuation of Ser. No. 477,580, Mar. 28, 1983, abandoned, which is a continuation-in-part of Ser. No. 449,898, Dec. 15, 1982, abandoned.

[51] Int. Cl.$^4$ .................. B29C 33/52; B29C 33/54
[52] U.S. Cl. ........................ 264/25; 106/38.9; 264/37; 264/221; 264/317; 264/DIG. 44
[58] Field of Search .................. 249/175, 62, 63; 264/37, 221, 317, 338, DIG. 44, 25; 164/34, 35, 369; 106/38.9

[56] References Cited

U.S. PATENT DOCUMENTS

| | | | |
|---|---|---|---|
| 1,523,519 | 1/1925 | Gibbons | 264/317 |
| 3,136,831 | 6/1964 | Zinn | 264/317 |
| 3,356,129 | 12/1967 | Anderko | 264/221 |
| 3,692,551 | 9/1972 | Weaver | 249/61 |
| 4,389,367 | 6/1983 | Hudson | 264/314 |

Primary Examiner—Jeffery Thurlow
Assistant Examiner—Leo B. Tentoni
Attorney, Agent, or Firm—Krass and Young

[57] ABSTRACT

A process for pressure molding an article around a hardened salt mold core made from a mixture of relatively low melting temperature salt and sand wherein the core is removed from the finished article by immersion of the article containing the core into a molten bath mixture of the core material thereby to melt the core out of the article, recover the core material, and thus replenish the bath for use in making additional cores. The bath is originally constituted by melting a suitable quantity of a dry premix of the salt and sand.

14 Claims, 1 Drawing Sheet

PRESSURE MOLDING PROCESS USING SALT CORES AND COMPOSITION FOR MAKING CORES

This application is a continuation of application Ser. No. 477,580, filed Mar. 28, 1983, now abandoned, which is a continuation-in-part of Ser. No. 449,898 filed Dec. 15, 1982, now abandoned.

FIELD OF THE INVENTION

This invention relates to pressure molding processes and particularly to a molding process utilizing a salt core or molding core made from a mixture of particles of inert material and relatively low melting temperature salt wherein the core is removed from the finished article by suitable means preferably by melting the core from the article with the core intact therein into a molten bath of the core material.

PRIOR ART AND BACKGROUND OF THE INVENTION

U.S. Pat. No. 3,692,551 (incorporated herewith by reference), issued Sept. 19, 1972 to W. R. Weaver, discloses a pressure molding process utilizing a non-detrudable molding core which is made by casting a molten salt and sand mixture. As disclosed in the patent, the use of salt mixtures having a relatively low melting point produces a core having extremely smooth porcelain-like surface characteristics which are highly desirable in pressure molding processes. In addition, the use of sand as part of the core composition results in the core having high compressive strength, a requirement for die casting and for molding articles out of plastics.

According to the patent, the cores are made by dip-coating or surface-coating solid sand cores in a molten salt bath or, alternatively, by mixing sand into a molten salt bath and casting the resulting liquid mixture into core form.

The patent discloses the removal of the core from the finished article by dissolving, flushing, and leaching out the core as a solute in water or in weak acid solution or by mechanical vibration.

SUMMARY OF THE INVENTION

In one aspect, our invention constitutes an improvement in the process disclosed in U.S. Pat. No. 3,962,551, particularly in the removal of the salt core from the finished molded article. In one embodiment of our invention, the core is removed from the article by melting the core from the article while the article is positioned over or in a fused or molten salt bath, the constituents of which bath are identical or substantially identical to those of the core itself. Quite unexpectedly, removal of the core at fusion temperature is accomplished readily and without adverse affect on the molded article. Immersion is carried out under bath conditions sufficient with respect to time and temperature to melt the core after which the article is removed, the resulting melted core being drained from the article back into the bath. Thus, by this process, the core not only is recovered cleanly and efficiently out of the molded article but, at the same time, is recovered into the molten mix thus replenishing the bath and enabling its further use in making additional cores. Our method thus eliminates the need either for dissolving, or for mechanical vibration, or for separately recovering the core material, let alone the need for special apparatus to recover the salt from either acid or water. The invention also contemplates a preferred embodiment in which the bath, for melt-out purposes, is separate from the main bath and maintained at a different (normally lower e.g. 50 degrees F.) temperature so as to minimize the possibility of adverse effects on the molded article. The core material used in the process comprises fusible salt and particles of inert material such as sand, especially foundry sand and aggregates, and may also include glass fibers, glass beads, carbon fibers, plastic fibers, metal fibers, calcium silicate, pumice, mica flakes, and similar inert particles affording structural strength (compressive, shear and tensile) to solid core material, and selected blends and mixtures of any such materials. Sand is a preferred inert material either alone or in admixture with other inert material. In the following description, the inert material is sometimes described as sand but it will be realized that other inert materials may be used in place of or in admixture with sand for purposes of the invention.

In another aspect, our invention resides in a process for making molded articles by forming a moldable material such as plastic around solidified salt cores comprising the steps of:

A. preparing a homogeneous molten salt mixture preferably containing sodium nitrate, potassium nitrate and optionally sodium nitrite and preferably comprising about 40% to 69% by weight sand;

B. forming a mold core of given shape from a portion of the molten salt mixture and cooling and solidifying the formed core;

C. coating the solidified mold core with a wet film of hydrophobic lubricating material and drying the film; and D. pressure molding a moldable material preferably a thermosetting resin or phenolic thermosetting resin, around the resulting solid and coated core to cause the moldable material to solidify and thus obtain a solid structurally rigid molded article containing the core. In one preferred embodiment of the process, the molten mixture contains glass fibers, carbon fibers, or mica flakes. The process preferably includes the further step of reclaiming the core material and returning it to the mixture, preferably by immersing the article containing the core in the molten mixture.

In another aspect, our invention resides in a process for making molded articles by forming a moldable material around solidified cores made of particles of inert material, at least one of which is of such physical character as to add tensile strength and flexibility to said cores, said inert materials being intimately mixed and covered with fused salt comprising the steps of:

A. preparing a bath by means of mixing and heating the particles and salt to obtain a homogeneous molten bath mixture, preferably comprising about 40% to about 60% by weight of inert material;

B. forming a mold core of given shape from a portion of the molten bath mixture and cooling and solidifying the formed core; and C. pressure molding a moldable material, preferably a thermosetting resin or phenolic thermosetting resin, around the resulting solid core to cause the moldable material to solidify and thus obtain a solid structurally rigid molded article containing the core. In a preferred embodiment, the process comprises the steps prior to pressure molding of coating the solidified mold core with a wet film of hydrophobic lubricating material and drying the film.

In another preferred embodiment, the process comprises the additional step D of thereafter heating the molded article positioned in or over the molten bath under temperature conditions sufficient to melt and recover the core from the article into the bath but insufficient to adversely affect the article thus freed of the core. Preferably, the heating step is carried out by means comprising radiant energy, preferably microwave heating in the zone above the bath, and with the molded article positioned over the bath such that, when the core is melted, the resulting melted core material is allowed to flow by gravity into the bath thus recovering the core material for further ongoing operation. In a preferred embodiment of the process, the strength and flexibility-adding inert material comprises glass fibers, carbon fibers, or mica flakes.

In another aspect of the invention, the bath is originally constituted by melting a dry premixed combination of the inert particles and salt in the desired relative percentages and having the desired physical and process characteristics. This totally eliminates the need for careful mixing of the two principal constituents at the time of constituting the bath and, more importantly, when adding make up materials to the bath. Thus, especially for a continuous article molding process, one is assured of substantial uniformity from one core to another throughout the course of the process, however extended it may be.

BRIEF DESCRIPTION OF THE DRAWING

The single figure is a flow chart in block diagram form illustrating a preferred embodiment of the pressure molding process of the present invention.

DETAILED DESCRIPTION

Figure 1:
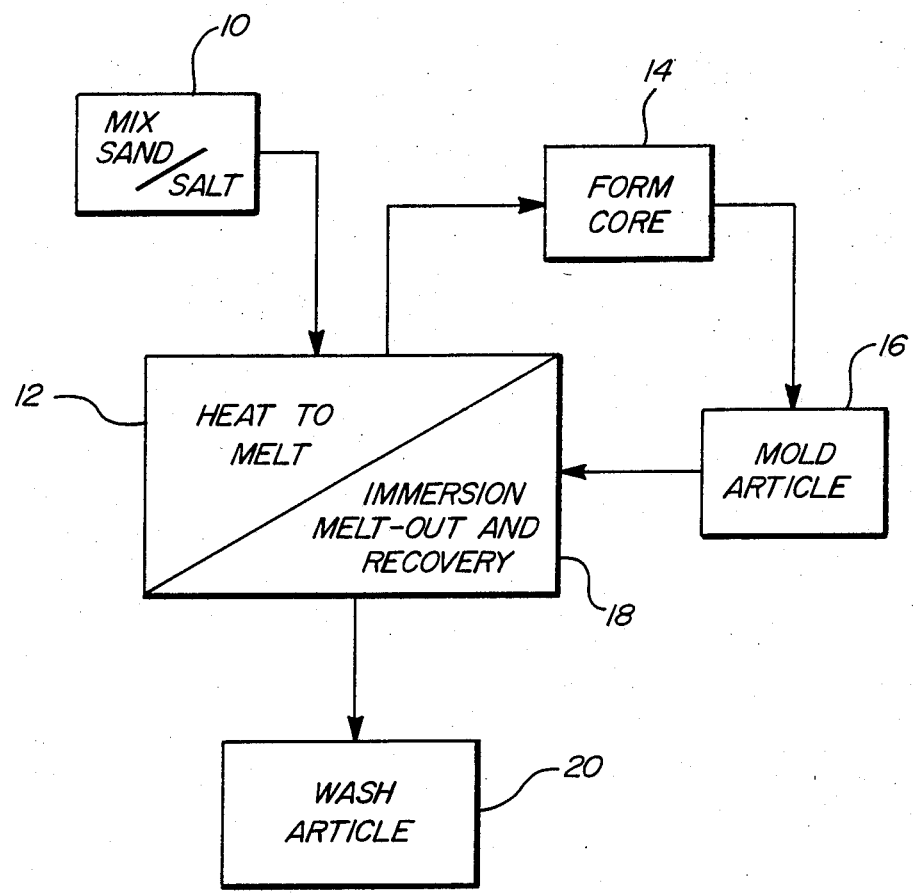

Referring to the drawing, the present process for making core-free (hollow) molded articles by forming a moldable material around solidified salt cores or mold cores made of particles of inert material intimately mixed and covered with fused salt comprising the steps of:

A. preparing a bath by means of mixing and heating (step 10) the particles and salt (step 12) to obtain a homogeneous molten bath mixture;

B. forming a mold core (step 14) of given shape from a portion of the molten bath mixture and cooling and solidifying the formed core;

C. pressure molding a moldable material (step 16) around the resulting solid core to cause the moldable material to solidify and thus obtain a solid structurally rigid molded article containing the core; and D. thereafter heating the molded article (step 18) positioned in or over the molten bath under temperature conditions sufficient to melt and recover the core from the article into the bath (by gravity flow with agitation if necessary) but insufficient to adversely affect the article thus freed of the core; and optionally washing (step 20) the article to remove residual salt and/or sand.

For purposes of the invention, as indicated, one uses sand as a core material. In a preferred embodiment, one uses washed foundry sand that, with respect to particle size, is sufficiently fine for molding, preferably in the range of mesh sizes from 40 to 500, and more preferably from 80 to 100. Also one uses a low melting salt mixture, which may comprise alkali metal nitrates, nitrites, chlorides, carbonates, sulfates and phosphates. Preferably, one uses a mixture comprising alkali metal nitrates and/or nitrites such as sodium and potassium nitrates and nitrites, optionally with one or more alkali metal chlorides. Eutectic salt mixtures are preferred. Commercially available grades are suitable, especially granulated salt mixtures formulated to melt at a specified temperature in a range of graded temperatures. In a preferred embodiment, the core material comprises one or more alkalizing salts or agents for strengthening purposes, not more than about 5% by weight, such as an alkali metal or alkaline earth metal hydroxide or carbonate, preferably sodium or calcium hydroxide. It is thought that the alkalizing agent serves to provide an advantageously strengthening chemical bond between the inert material and the fusible salt. The core material may be anhydrous or may contain water in small amounts as, for example, ranging from 1 or 2% up to about 10% or more by weight. For purposes of the invention, the term "low melting" refers to salt mixtures selected such that, when constituted as intact mold cores in articles ready for melt-out to the molten bath, they can be melted out of the articles to recover the core material without adversely affecting the resulting core-free molded articles. Preferred sand/salt bath mixtures are those melting in the range from about 250 degrees to about 600 degrees F. or more. The inert material and salt mixture may vary in its composition, preferably containing about 40 to about 60% by weight inert material. The mixture, as is hereinafter described in greater detail, is placed in a suitable heating vessel such as a commercial heat treating furnace and brought to a molten state for casting purposes. The mixture is maintained in a relatively homogeneous condition by means of a mechanical agitator which may be selected from any of various types which are commercially available.

From the melt, material is taken as needed and used to form cores of the desired size and configuration. In accordance with the teaching of the Weaver Pat. 3,692,551, such cores are preferably made by casting the molten salt/sand mix using a hinged mold. Thereafter, the cores are used to pressure mold a moldable material, such as a metal, or a thermoplastic or thermosetting filled or unfilled plastic, in a compression molding or injection molding machine (for a discussion of suitable plastics and compression molding apparatus, incorporated herein by reference, see Plastics, 6th Ed., Van Nostrand, New York, 1981; Modern Plastics Encyclopedia, 1982–1983, McGraw-Hill. 1982). In some instances, to facilitate the molding, it is desirable to use a barrier coating or slip aid to coat the salt core prior to molding. For this purpose, the salt core is covered with a lubricating coating which will make for easier injection molding and a smoother surface and will prevent attack on the salt core. Any of various coating materials are suitable such as silicones, paraffin waxes or heavy oils dissolved (e.g. 3–5% by weight) in mineral spirits, which after applying in a wet film and air drying leave a smooth hard dry hydrophobic surface. The coating serves not only to provide a smoother better interior surface for the molded part but also to result in lower core breakage. The cores may be used in a variety of forms of metal casting and plastic molding involving a wide range of temperature and pressure conditions. For plastic molding especially, one uses a core that has a melt-out temperature sufficiently lower than the critical temperature, i.e. the softening point or degradation point, of the particular plastic being molded so that under the melt-out conditions employed the molded plastic article is not adversely affected. The choice of core will vary from case to case but in general, for a typical melt-out cycle time, e.g. 2-5 minutes, will be such that the melt-out temperature is lower by at least 50 degrees F. than the critical temperature of the plastic article undergoing core removal. During the pressure molding step, the core is suitably supported within the mold so that the mold material under compression essentially surrounds and captures the core and thereafter becomes structurally rigid. In accordance with one embodiment of the invention, the thus finished article with the core intact therein is immersed into, i.e., positioned within, the core source bath at step 18 for a time sufficient to effectively melt the core material out of the article and thus directly make up or recover said material back into the bath without the need for leaching or mechanical vibration or other recovery procedure. In another embodiment, the finished molded article with the core intact therein is positioned, not within the bath, but over the bath such that when the core is melted (by means presently to be described), the melted core material is allowed to flow and drop by gravity into the bath, thus recovering the core material for further ongoing operation. In this embodiment, heating of the article for melt-out of the core is done by radiant energy, preferably microwave heating in the zone above the bath. As indicated, during the molding step 16 and prior to the melt-out step 18, the molded article becomes structurally rigid (that is, sets up or is hardened or cured or partially cured). The molten bath (step 18), as indicated, or the mentioned microwave zone or its equivalent melt-out zone, is kept below the temperature which would unduly soften or melt or otherwise adversely affect the molded article. The article is thereafter washed or rinsed, if necessary, at step 20 to remove all traces of salt or sand therefrom. A small amount of sand/salt mix may be lost in the course of the process, although this amount is far less than would be lost or wasted if the cores were leached out or broken out and discarded. For example, there may be losses both in casting the core and by drag out between the immersion melt-out step 18 and rinse or wash step 20. In a preferred embodiment at step 10, to insure uniformity of core composition and to eliminate the need for weighing and mixing separate quantities of sand and salt, we mix dry sand and granulated salt and bulk-package the mixture, preferably in small (e.g., 50 lb.) bags for shipment and storage. Thus, at the work site, one or more bags or partial bags of the premix advantageously may be added directly to the bath (step 12) for make up purposes or used to originally constitute the bath at start-up.

The invention and best mode of practicing the same are illustrated by the following examples.

EXAMPLE 1.

A dry premix is made by blending washed foundry sand (by weight 55 parts, 80-100 mesh, Wedron C-30 sand) and granulated salt (27 parts sodium nitrate, 18 parts potassium nitrate). The resulting dry blended premix, packaged in shipper bags (50 lb. capacity), is suitable for shipment and long term storage, without appreciable particle desegregation. The premix melting at about 430 degrees F. can be used for making a molten salt bath operating at a useful working temperature of about 470-480 degrees F. or higher. To a bath apparatus (jacketed resistance band heated steel pot, 15 inches deep by 15 inches in diameter) are added 100 pounds of the sand/salt premix. The bath is heated to melt the premix and the molten bath mixture is maintained at a temperature of about 480 degrees F. and stirred with a heavy duty air motor agitator that keeps the sand uniformly suspended. For core molding, a split mold of rectilinear shape is used. The mold, of heavy aluminum, is of a design that can be quickly opened and closed by means of spring loaded quick release hinges. The mold is jacketed with circulating pressurized hot (230 degrees F.) water. For core molding, the molten bath mixture is gravity fed to the mold by pouring from a preheated ladle into an opening (sprue hole) in the top of the mold. The thus filled mold is allowed to cool for 20-25 seconds and is then opened and the molded core part removed and held for transfer to compression molding apparatus. Typically, the molded core parts are uniform and very smooth. The compressive strengths at room temperature and 330 degrees F. are greater than 20,000 and 6,000 psi, respectively. The cores can be remelted in 2 to 5 minutes at 475-480 degrees F. A molded core part, prepared as described and maintained at 330 degrees F. is transferred from the core mold to the mold cavity of an injection molding machine. Thermoset phenolic resin bead material (Resin RX660, Rogers, Co., Manchester, Conn.) at a temperature of 330 degrees F. and a pressure of 15,000 psi is then injection molded into the mold cavity and around the molded salt core. After 30 seconds, the resulting phenolic resin molded article cools in the mold sufficiently to polymerize and solidify and become structurally rigid. The molded plastic article with the salt core intact is then removed and immersed for 2 to 5 minutes in the salt bath mixture maintained at 480 degrees F. While immersed, the article is purposely held in a position allowing for good drainage of liquid from cavities of the article, especially for good drainage just as the article is being removed from the bath. During the melt-out period, the salt core melts completely so that as the plastic article is being removed from the salt bath mixture, any remaining melted salt core material quickly drains from the article into the bath for replenishment of the bath. Any traces of salt or sand remaining on the molded article are washed off with water.

EXAMPLE 2.

A dry premix is made by blending 50% by weight of washed foundry sand (80-100 mesh, Wedron C-30 sand), 48% of granulated salt (sodium nitrate/sodium nitrite/potassium nitrate, 30:20:50), and 2% of chopped glass fiber. The resulting dry blended premix, packaged in shipper bags (50 lb. capacity), is suitable for shipment and long term storage, without appreciable particle desegregation. The premix melting at about 305 degrees F. can be used for making a molten salt bath operating at a useful working temperature of about 350-380 degrees F. or higher. To a bath apparatus (jacketed resistance band heated steel pot, 15 inches deep by 15 inches in diameter) are added 100 pounds of the sand/salt premix. The bath is heated to melt the premix and the molten bath mixture is maintained at a temperature of about 350 degrees F. and stirred to keep the sand uniformly suspended. For core molding, a mold such as the mold described above is used. The molten bath mixture is gravity fed to the mold by pouring from a preheated ladle into an opening (sprue hole) in the top of the mold. The thus filled mold is allowed to cool for 20-25 seconds and is then opened and the molded core part removed and held for transfer to compression molding apparatus. Typically, the molded core parts are uniform and very smooth. The compressive strengths at room temperature and 250 degrees F. are greater than 20,000 and 8,000 psi, respectively. The cores can be remelted in 20-30 seconds at 350-380 degrees F. A molded core part, prepared as described and maintained at 250 degrees F. is transferred from the core mold to the mold cavity of an injection molding machine. A commercially available polyester resin bulk molding compound (BMC) at a temperature of 280 degrees F. and a pressure of 15,000 psi is then injection molded into the mold cavity and around the molded salt core. After setting, the molded article polymerizes in the mold sufficiently to solidify and become structurally rigid. The article with the salt core intact is then removed and immersed for 2 to 5 minutes in the salt bath mixture maintained at 350 degrees F. to melt the core. While immersed, the article is positioned to allow the core liquid to drain from cavities of the article, and the article is washed and dried.

Further examples which follow the foregoing procedure according to the invention, at different temperatures with appropriate moldable materials, are as follows:

| Ex. | Components (Parts by Wt.) | | | | Inert Particles or Additives | Melting Temp. (°F.) | Operating Bath Temperature (°F.) |
|---|---|---|---|---|---|---|---|
| | Silica Sand | NaNO$_2$ | NaNO$_3$ | KNO$_3$ | | | |
| 3 | 50 | 18 | 3 | 24 | 5 (Glass fibers) | 300 | 350 |
| 4 | 53 | 11 | 14 | 20 | 2 (Carbon fibers) | 360 | 410 |
| 5 | 55 | — | 26 | 18 | 1 (Sodium hydroxide) | 440 | 490 |
| 6 | 10 | — | 56 | 14 | 20 (Mica flakes, 20 mesh) | 510 | 560 |

The embodiments of the invention in which an exclusive property or privilege is claimed are defined as follows:

We claim:

1. A premix composition for producing mold cores for use in process for making molded plastic articles by forming a moldable material around solidified salt cores or mold cores made of particles of inert material intimately mixed and covered with fused salt comprising the steps of:
   (A) preparing a bath by means of mixing and heating the particles and salt to obtain a homogeneous molten bath mixture:
   (B) forming a mold core of given shape from a portion of the molten bath mixture and cooling and solidifying the formed core;
   (C) pressure molding a moldable plastic material around the resulting solid core to cause the moldable material to solidify and thus obtain a solid structurally rigid molded article containing the core; and
   (D) thereafter heating the molded article positioned in or over the molten bath under temperature conditions sufficient to melt and recover the core from the article into the bath but insufficient to adversely affect the article thus freed of the core; wherein said premix composition is comprised of: an unfused, blended, dry mixture of granulated mold core salt and an inert material selected from the group consisting essentially of: glass fibers, carbon fibers and mica flakes.

2. A premix according to claim 1 where the salt contains sodium nitrate, potassium nitrate and optionally sodium nitrite.

3. A premix according to claim 1 where the salt contains an alkalizing agent.

4. A premix according to claim 3 where the alkalizing agent comprises sodium hydroxide.

5. A premix composition according to claim 1 where the salt includes sodium nitrate and potassium nitrate.

6. A premix according to claim 5 where the mixture contains about 27 parts by weight sodium nitrate and about 18 parts by weight potassium nitrate.

7. A process for making molded articles by forming a moldable material around solidified cores made of particles of inert material selected from the group consisting essentially of: glass fibers, carbon fibers, and mica flakes, at least one of which is of such physical character as to add tensile strength and flexibility to said cores, said inert materials being intimately mixed and covered with fused salt said process comprising the steps of:
   (A) preparing a bath by mixing and heating the particles and salt to obtain a homogeneous molten bath mixture;
   (B) forming a mold core of given shape from a portion of the molten bath mixture and cooling and solidifying the formed core; and
   (C) pressure molding a moldable plastic material around the resulting solid core to cause the moldable material to solidify and thus obtain a solid structurally rigid molded article containing the core.

8. A process according to claim 7 comprising the additional step of:
   D. thereafter heating the molded article positioned in or over the molten bath under temperature conditions sufficient to melt and recover the core from the article into the bath but insufficient to adversely affect the article thus freed of the core.

9. A process according to claim 7 where the moldable material is a thermosetting resin.

10. A process according to claim 7 where the moldable material is a phenolic thermosetting resin.

11. A process according to claim 7 where the heating step is carried out by means comprising radiant energy and with the molded article positioned over the bath such that, when the core is melted, the resulting melted core material is allowed to flow by gravity into the bath thus recovering the core material for further ongoing operation.

12. A process according to claim 11 where the heating step comprises microwave heating in the zone above the bath.

13. A process according to claim 7 where the bath mixture comprises about 40% to about 60% by weight of inert material.

14. A process according to claim 7 comprising the steps prior to pressure molding of coating the solidified mold core with a wet film of hydrophobic lubricating material and drying the film.

* * * * *